Figure 1:
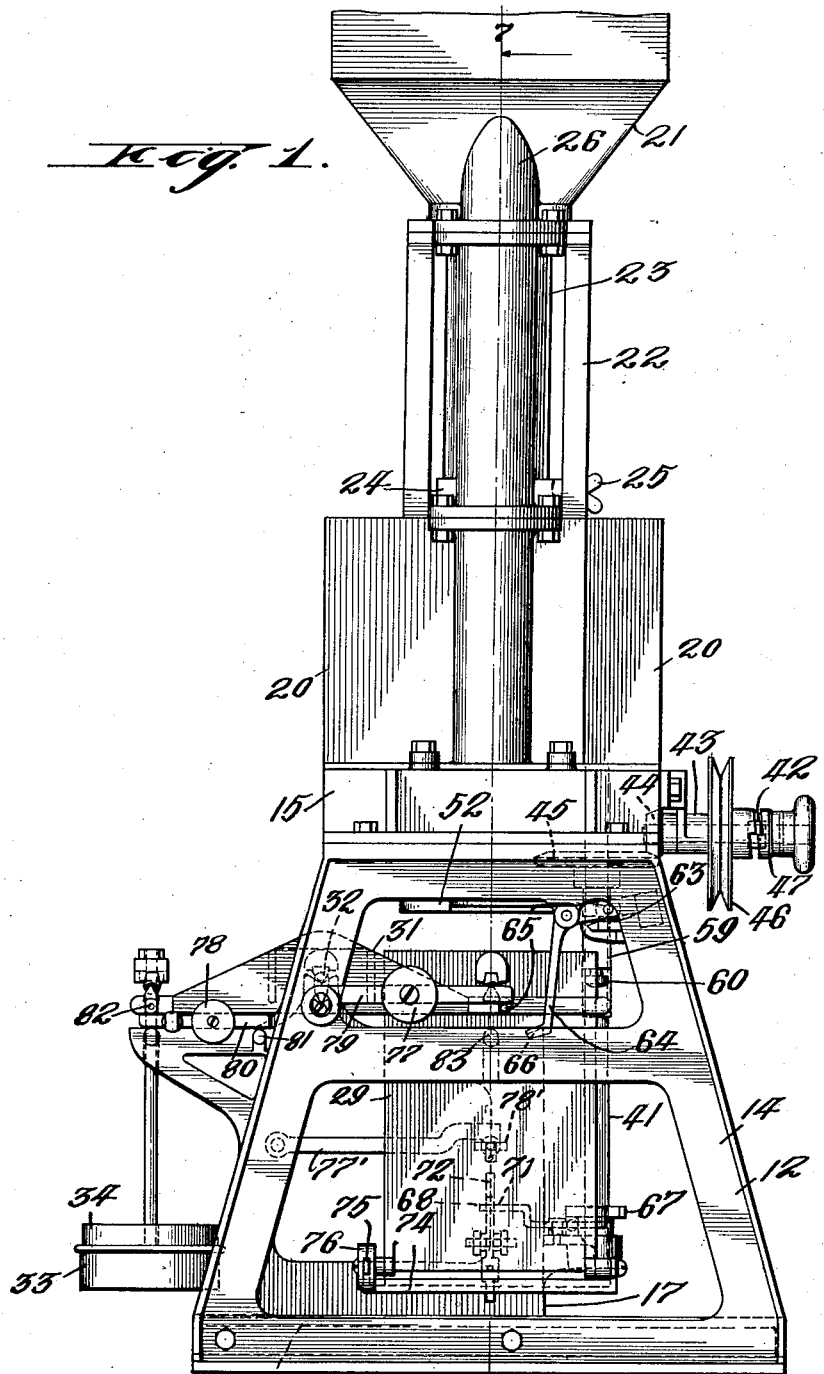

J. NIELD.
AUTOMATIC WEIGHING MACHINE.
APPLICATION FILED APR. 6, 1911.

1,014,717.

Patented Jan. 16, 1912.
8 SHEETS—SHEET 1.

J. NIELD.
AUTOMATIC WEIGHING MACHINE.
APPLICATION FILED APR. 6, 1911.

1,014,717.

Patented Jan. 16, 1912.
8 SHEETS—SHEET 2.

J. NIELD.
AUTOMATIC WEIGHING MACHINE.
APPLICATION FILED APR. 6, 1911.

1,014,717.

Patented Jan. 16, 1912.
8 SHEETS—SHEET 4.

J. NIELD.
AUTOMATIC WEIGHING MACHINE.
APPLICATION FILED APR. 6, 1911.

1,014,717.

Patented Jan. 16, 1912.

8 SHEETS—SHEET 5.

J. NIELD.
AUTOMATIC WEIGHING MACHINE.
APPLICATION FILED APR. 6, 1911.

1,014,717.

Patented Jan. 16, 1912.
8 SHEETS—SHEET 6.

Witnesses
F. L. Farrington
Laura A. Kelley

Inventor:
Josiah Nield,
by Morsell & Caldwell
Attys.

J. NIELD.
AUTOMATIC WEIGHING MACHINE.
APPLICATION FILED APR. 6, 1911.

1,014,717.

Patented Jan. 16, 1912.
8 SHEETS—SHEET 8.

UNITED STATES PATENT OFFICE.

JOSIAH NIELD, OF NORTH MILWAUKEE, WISCONSIN, ASSIGNOR TO AVERY SCALE COMPANY, OF NORTH MILWAUKEE, WISCONSIN, A CORPORATION OF WISCONSIN.

AUTOMATIC WEIGHING-MACHINE.

1,014,717. Specification of Letters Patent. Patented Jan. 16, 1912.

Application filed April 6, 1911. Serial No. 619,214.

*To all whom it may concern:*

Be it known that I, JOSIAH NIELD, a subject of the King of Great Britain, residing in North Milwaukee, in the county of Milwaukee and State of Wisconsin, have invented new and useful Improvements in Automatic Weighing-Machines, of which the following is a description, reference being had to the accompanying drawings, which are a part of this specification.

This invention relates to improvements in automatic weighing machines and more particularly to weighing machines which are adapted to weigh material of a granular or pulverous character and divide it into small portions for filling packages.

It is one of the objects of this invention to provide a weighing machine which will automatically and alternately feed material to the weighing hoppers and accurately weigh the material and discharge the same independently so it may be placed in packages adapted to contain a certain predetermined amount of material.

A further object of the invention is to provide a weighing machine which is adapted to automatically feed, weigh and separate material at a fast rate of speed for use in filling packages usually containing a pound of material.

A further object of the invention is to provide a weighing machine with a main or maximum feed and with an auxiliary or minimum feed in order to obtain great rapidity and accuracy in the feed and in the weighing of the material.

A further object of the invention is to provide a weighing machine having adjustable means for limiting the maximum amount of material which is fed to the scale hopper previously to its discharge from the feeding means to the weighing hopper.

A further object of the invention is to provide means for automatically emptying the scale hoppers as soon as the material has been weighed.

A further object of the invention is to provide a double acting weighing machine having two weighing hoppers which alternately receive and weigh and discharge the material to form a continuously working machine and thus expedite the operation of weighing the material.

A further object of the invention is to provide a weighing machine parts of which are actuated from a source of power.

A further object of the invention is to provide a weighing machine of the character described with compensating devices for accurately adjusting the scale beams.

A further object of the invention is to provide a weighing machine of the character described which is comparatively simple in construction and is entirely automatic in its operations.

With the above, and other objects in view the invention consists of the automatic weighing machine and its parts and combinations as set forth in the claims, and all equivalents thereof.

Figure 2:
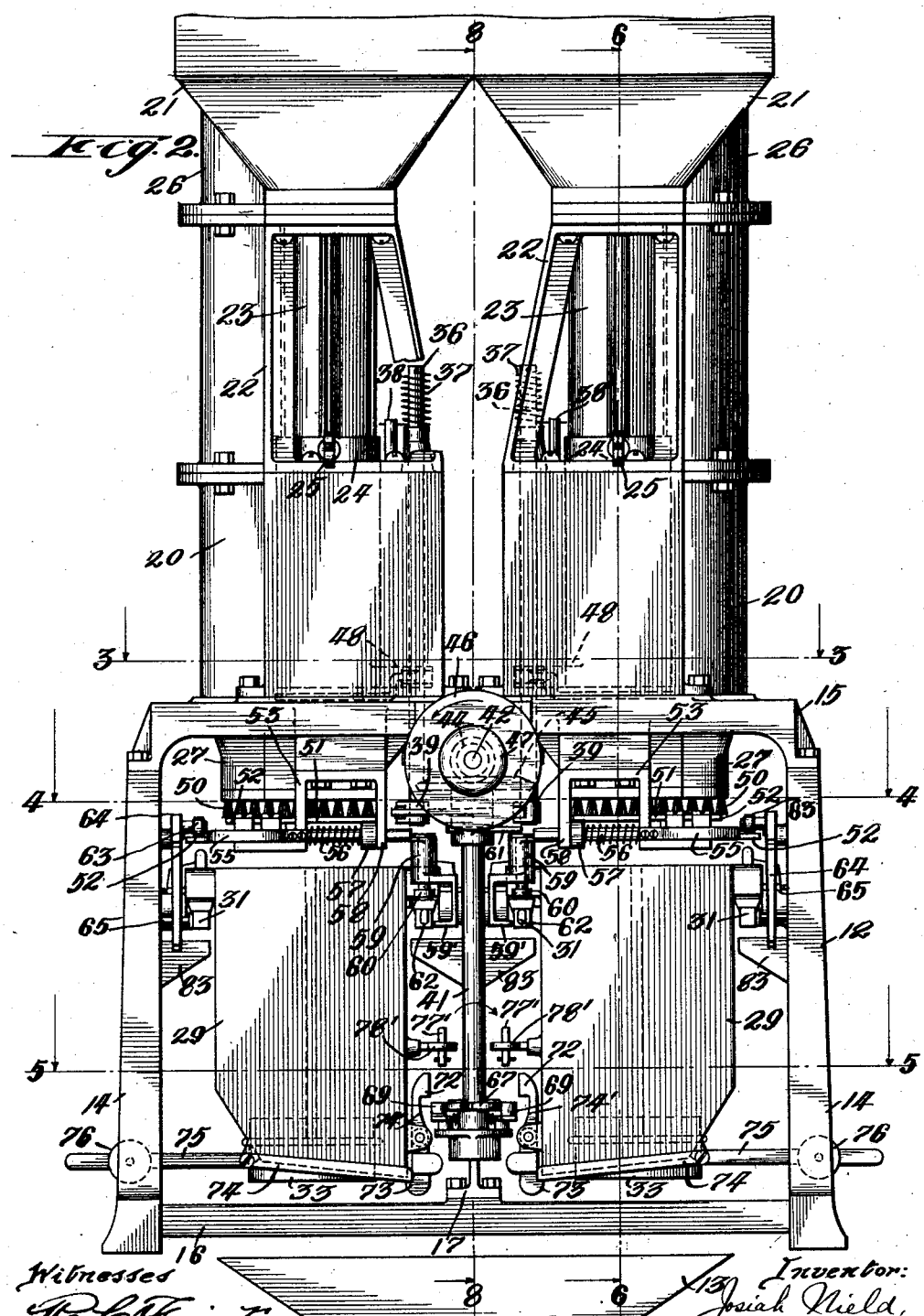
Figure 3:
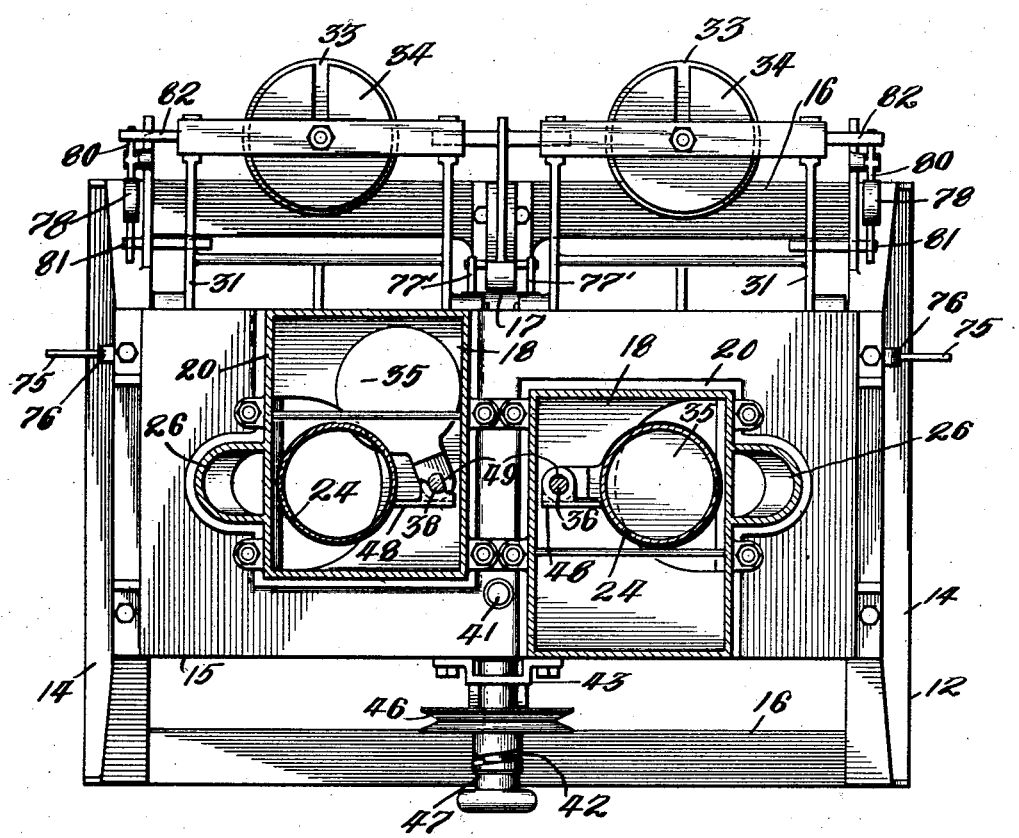
Figure 4:
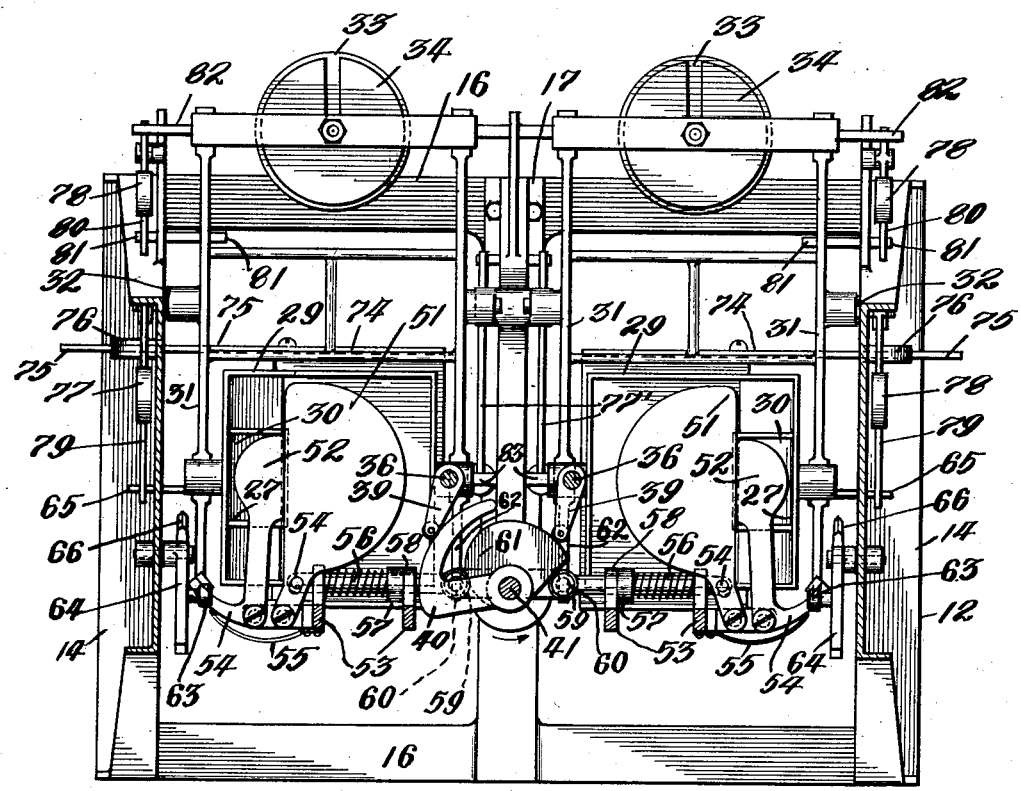
Figure 5:
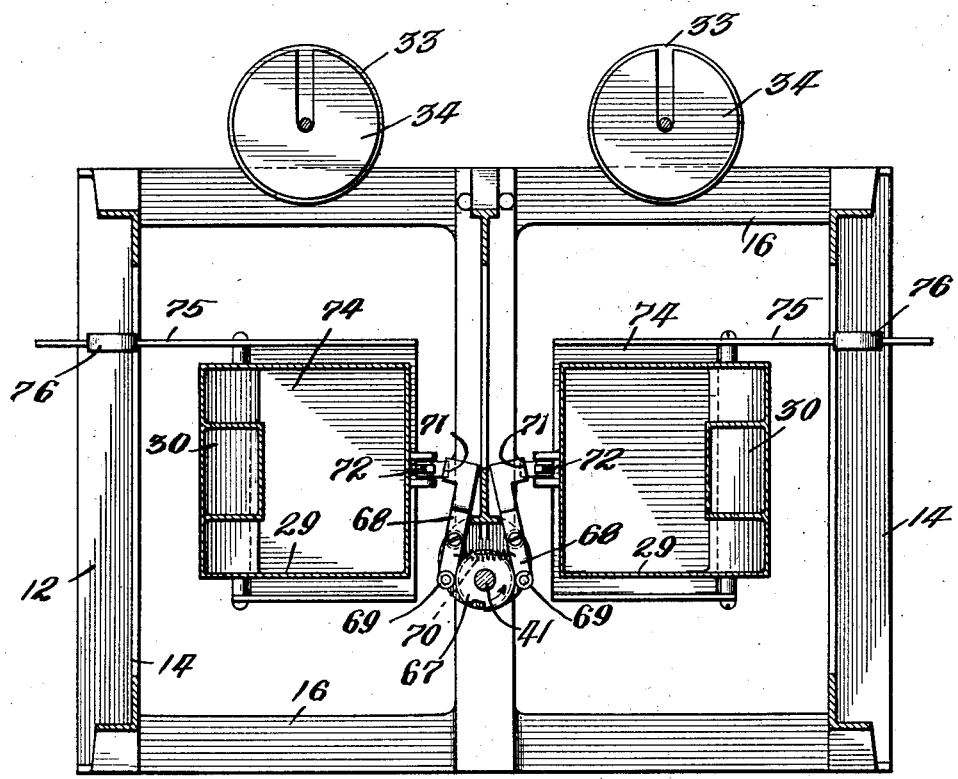
Figure 6:
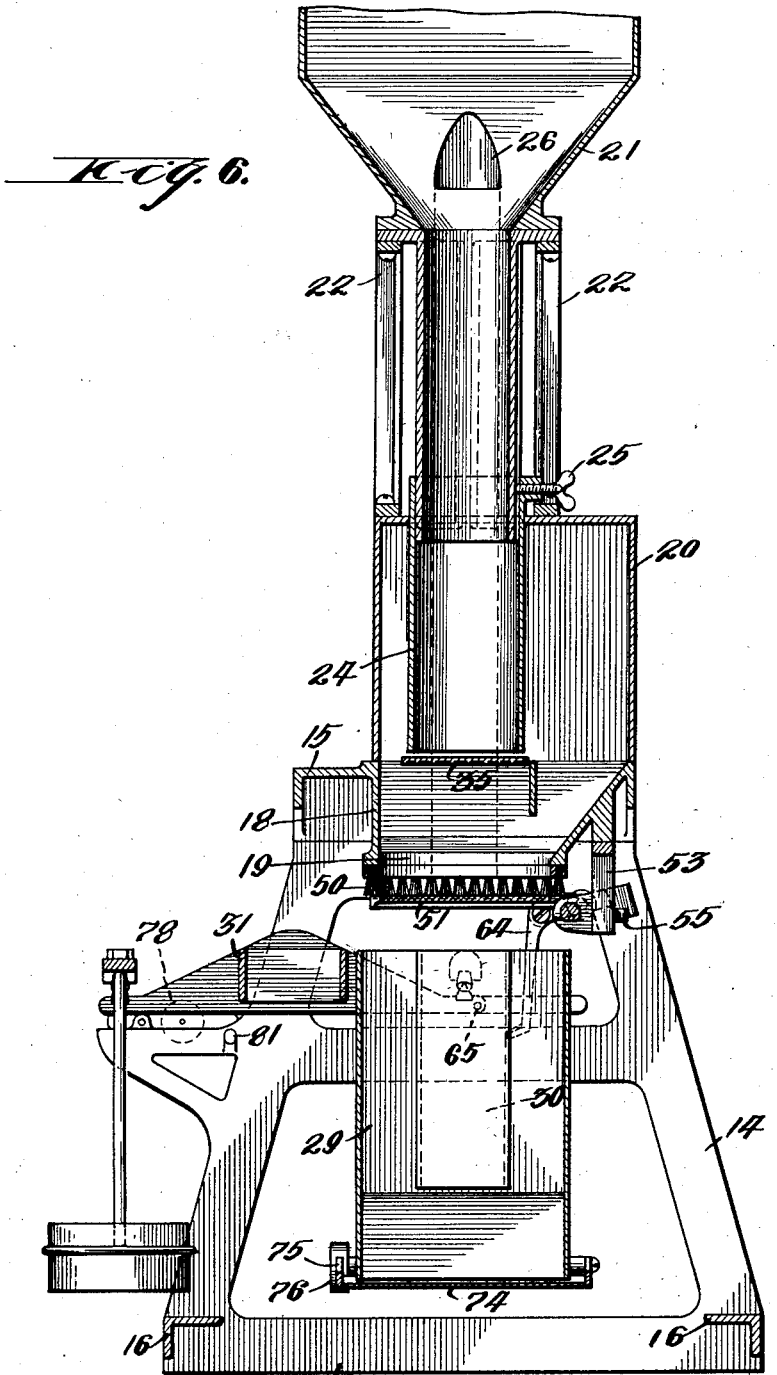
Figure 7:
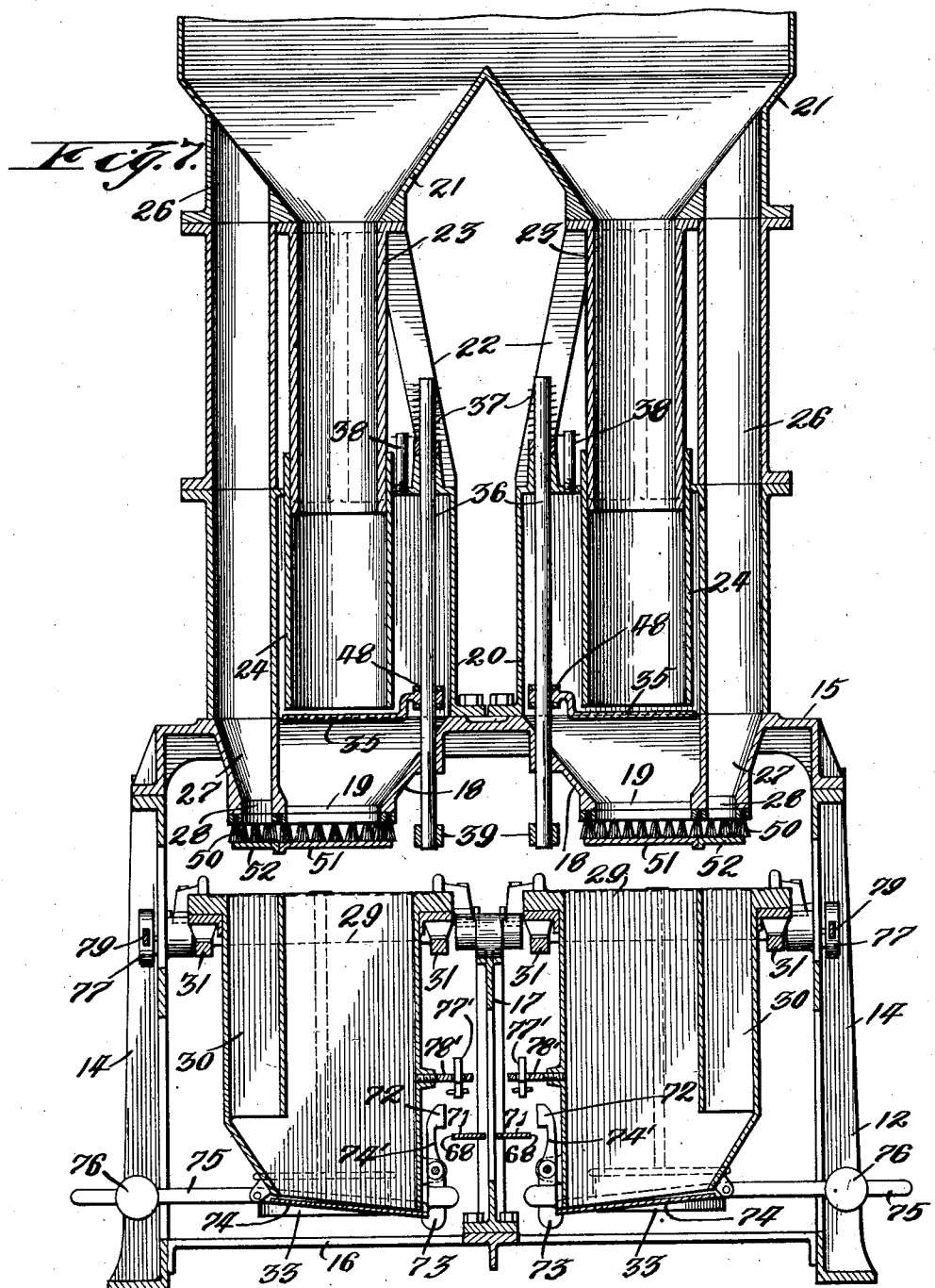
Figure 8:
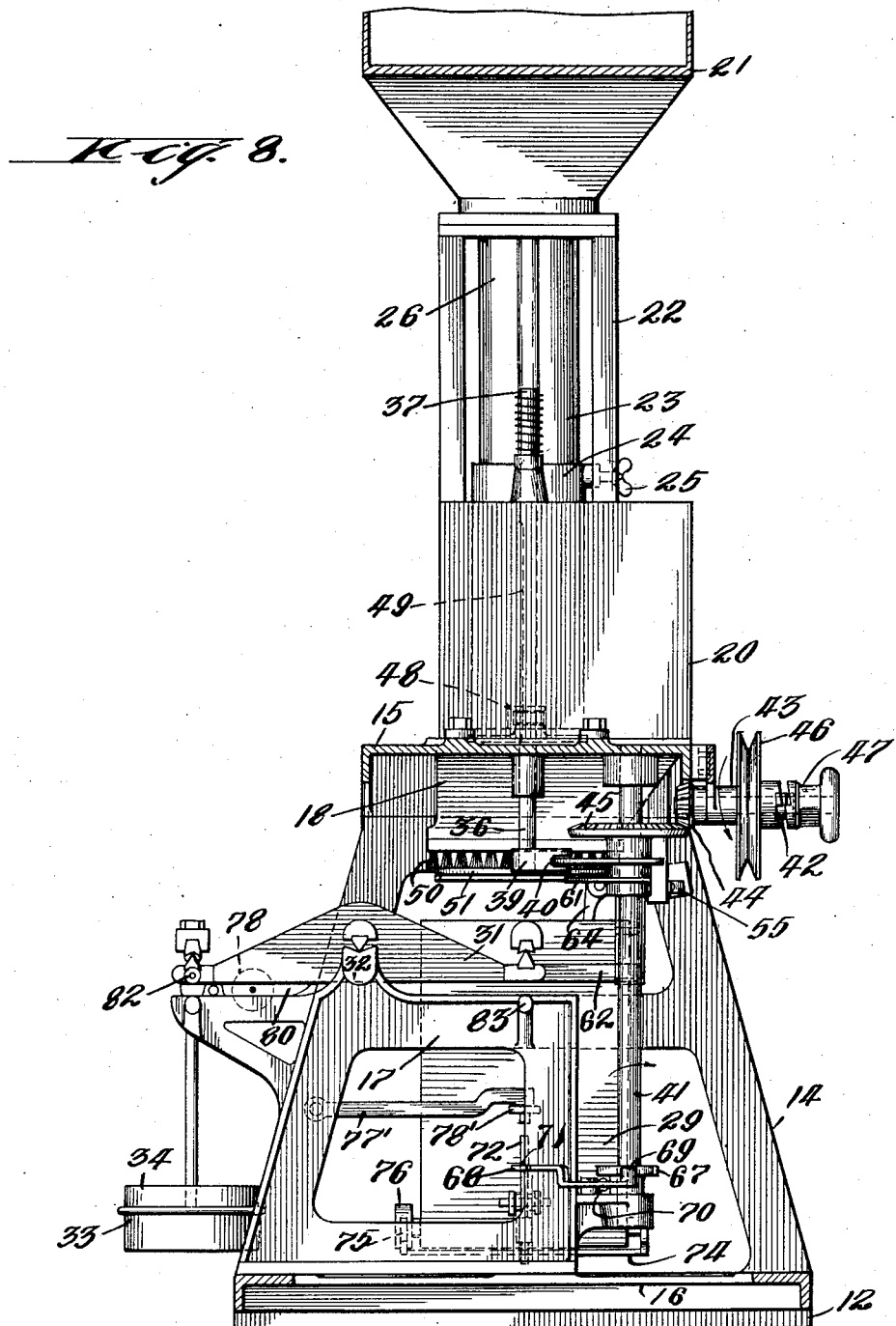

In the accompanying drawings in which the same reference characters indicate the same parts in the several views, Figure 1 is a side view of the improved automatic weighing machine and a fragment of a hopper into which the weighed material may be discharged; Fig. 2 is a front view thereof, a part broken away to show other parts in the rear thereof; Fig. 3 is a transverse sectional view thereof, taken on line 3—3 of Fig. 2; Fig. 4 is a transverse sectional view thereof taken on line 4—4 of Fig. 2; Fig. 5 is a transverse sectional view thereof taken on line 5—5 of Fig. 2; Fig. 6 is a vertical sectional view thereof taken on line 6—6 of Fig. 2; Fig. 7 is a vertical sectional view thereof taken on line 7—7 of Fig. 1; and Fig. 8 is a vertical sectional view of the weighing machine taken on line 8—8 of Fig. 2.

Referring to the drawings the numeral 12 indicates the supporting frame of the weighing machine and 13 the receiving hopper positioned therebeneath. This frame consists of side uprights 14, a top connecting portion 15, a bottom connecting portion 16 and a medial upright 17. The top connecting portion of the frame is formed with depending charge holding hoppers 18 which have discharge bottom openings 19 provided for the discharge of material therethrough. Rectangular boxes or covers 20 extending over the hoppers serve to increase the height and the capacity of the hoppers. Integral supply hoppers 21 positioned above the boxes and supported thereon by means of the standards 22 are provided with fixed feed tubes 23 which extend into openings provided in the tops of the boxes or covers 20. Adjustable feed tubes 24 telescoping the lower ends of the fixed feed tubes are adjustably suspended therefrom by means of the thumb screws 25 to provide for feeding the charging hoppers with amounts of material slightly less in quantity than the amount for which the machine is set to weigh at each weighing. The supply hoppers are provided with supplemental or dribble feed chutes 26 which are in communication with independent hopper compartments 27 and hopper openings 28 provided in the charge holding hoppers 18. Scale hoppers 29 provided with supplemental feed compartments 30 and positioned beneath the charge holding hoppers 18 are adapted to independently receive and hold the material discharged from the hoppers until the required amount has been discharged to balance the weight for which the machine has been adjusted. The scale hoppers are independently and pivotally supported on the inner ends of scale beams 31 which are mounted on the fulcrums 32 of the main frame. The outer ends of the beams are provided with weight pans 33 upon which weights 34 are placed to counter-balance the desired amounts of material. The lower open ends of the adjustable feed tubes are closed by means of feed tube valves 35 which are adjustably carried by the vertical rock shafts 36. These rock shafts 36 extend through and are journaled in the holding hoppers 18 and the boxes or covers 20. The upper ends of the rock shafts carry coiled springs 37 the upper ends of which extend through openings in the shafts and their lower ends are connected to stud pins 38 projecting upwardly from the boxes or covers 20. These springs normally hold the feed tube valves in closed position and cam arms 39 carried by the lower ends of the rock shafts and positioned to be alternately engaged by the upper cam 40 are adapted to alternately swing the valves to open position. The cam 40 is carried by a vertical cam shaft 41 journaled medially on the main frame. A short horizontal shaft 42 journaled in a bracket 43 and provided with a bevel pinion 44 on its inner end which meshes with a bevel gear 45 carried by the upper end of the vertical cam shaft 41 is adapted to constantly rotate the cam shaft while the machine is in operation. The horizontal shaft is provided with a pulley 46 loosely mounted thereon which is adapted to be connected to the shaft by means of the clutch 47 slidably mounted on said shaft. The pulley is rotated by a belted connection with a source of motion (not shown). In order to provide for the necessary adjustment of the feed tube valves when the feed tubes are adjusted the valves are loosely and longitudinally slidably mounted on the rock shafts between the ears of brackets 48 which are carried by the lower ends of the feed tubes. The rock shafts have flattened or slabbed portions 49 and the valve openings through which the rock shafts pass are correspondingly shaped to provide for the turning of the valves when the shafts are rocked.

The lower edges of the holding hoppers surrounding the discharge openings thereof are provided with a plurality of bristle tufts 50 constituting a brush edge for the holding hopper valves 51 and the supplemental valves 52 to rub on and form a material tight closure. The holding hopper valves 51 extend immediately beneath the holding hopper openings and are pivotally connected to and supported by the valve brackets 53 depending from the top connecting portion of the frame. The supplemental valves 52 which are also pivotally connected to the depending brackets are in the form of bell cranks and their short arms 54 are engaged by flat springs 55 extending from the brackets to normally hold the inner edges of the supplemental valves against the outer edges of the holding hopper valves. Spring retrieved plunger rods 56 slidably mounted in the brackets 53 have pins 54 projecting upwardly from their outer ends which extend through elongated slots provided in the holding hopper valves so that when said plunger rods are pushed outwardly both the hopper valves and the supplemental valves will be swung from beneath the respective discharge openings which they control. The spring retrieved plunger rods are provided with collars 57 which strike against depending arms 58 of the brackets to limit the inward movement of the plunger rods. The inner ends of these plunger rods are provided with depending tubular portions 59 through which loosely extend cam pins 60 which are adapted to be raised to a position to be alternately engaged by a plunger rod cam 61 carried by the cam shaft 41. The cam pins are provided with heads on both ends to prevent their separation from the tubular members and are raised to cam engaging positions by the projecting ends 62 of the scale beam 31 when the scale hoppers are in proper position to be filled.

When the hopper valves and the supplemental valves are moved to open position the hopper valves will swing to a position to close the supplemental feed chutes and prevent the discharge of material therefrom while the hopper discharge openings are discharging material. In moving the valves to open position the outer ends of the short arms 54 of the supplemental valves will be swung forwardly and engage the rollers 63 of the bell crank triggers 64. The bell crank triggers are pivoted to the side uprights 14 and are normally positioned so that the rollers 63 thereof are in the path of movement of the arms 54 and when the arms 54 are swung outwardly the said rollers will be momentarily forced upwardly while the arms 54 pass thereunder. When the arms have passed under the rollers the said rollers will then swing downward to their normal position and will hold the supplemental valve arm in open position until released by the bell crank trigger 64. When the plunger rod cam 61 rotates out of engagement with the particular plunger rod pin just engaged the spring surrounding the rod will react to slide the rod and swing the hopper valve to its normal closed position and in moving to its closed position will pass from beneath the supplemental chute opening and permit the discharge of material therefrom. As the approximate amount of material was discharged from the holding hopper the supplemental feed chute will quickly discharge the necessary amount of material to overbalance the scale weight and cause the scale hopper to descend to its discharging position. Each scale beam 31 is provided with an outwardly projecting pin 65 which is positioned to engage the lower hook arm 66 of the bell crank trigger when said trigger is engaged by the supplemental valve arm 54. When the trigger is thus engaged the lower hook arm 66 thereof will be swung rearwardly to a position in the path of movement of the projecting pin 65. The weight of each trigger arm carrying the roller is sufficient to swing the lower hook arm rearwardly to a position in the path of movement of the pin 65 and while the trigger is holding the supplemental valve in open position the lower hook end of said trigger arm will remain in said path of movement. When the scale hopper starts to descend to its discharging position the projecting pin 65 will engage the hook arm of the trigger 64 and will swing said trigger and release the supplemental valve which will be swung to a closed position by the spring 55.

The depending tubular portions 59 of the plunger rods 56 are provided with angular projections 59' which are positioned to extend beneath the scale beams when the holding hopper valves are in open position to prevent the said beams and the scale hoppers from descending to a discharging position while the said holding hopper valves are in open position.

The lower end of the cam shaft 41 carries a cam or notched wheel 67 and releasing levers 68 fulcrumed on a portion of the medial upright frame are positioned on opposite sides of the notched wheel and have antifriction rollers 69 journaled on their outer ends which ride on the periphery of the notched wheel. A coiled spring 70 connected to each releasing lever serves to hold the lever rollers yieldingly against the periphery of the notched wheel and causes the rollers to alternately ride into the notch or recess when the notched portion is rotated into register therewith. The ends of the releasing levers opposite to the ends carrying the antifriction rollers are provided with angular projections 71 which are adapted to engage the upper edges of scale hopper latches 72 when the scale hoppers are in discharging positions. These latches are medially pivotally connected to the sides of the scale hoppers and have lower hook ends 73 which hook beneath the scale hopper doors 74 to hold said doors in closed position. The latches are provided with recessed portions 74' which are in register with the angular projections of the releasing levers when the scale hoppers are in positions other than discharging positions to permit the play of the levers when moved by the notched wheel.

The scale hopper doors are provided with projecting arms 75 having counterweights 76 adjustably connected thereto which slightly overbalance the doors and cause them to automatically swing to closed position and into latching engagement with the hooked ends of the latches. When each scale hopper is charged with material and has descended to a discharging position the latch will be released from engagement with the door by the releasing lever and the weight of material resting on the door will overbalance the counterweight and the material will be discharged and as soon as discharged the counterweight will again cause the door to close and latch.

Horizontal links 77' pivotally connected to the medial upright and hooked into eyes 78' provided on the scale hoppers serve to prevent the said hoppers from swinging and at the same time do not interfere with the weighing operation.

In order to accurately balance the beam and hopper with relation to other parts of the scale compensating weights 77 and 78 are provided which are adjustably carried by levers 79 and 80 respectively and are positioned to engage opposite ends of the scale beams. The levers 79 are pivotally connected at one end to the uprights 14 at points in vertical alinement with the fulcrums and the opposite ends of the levers rest on top of the projecting pins 65 so that the weights may be adjusted on said levers to diminish or increase the weight on the outer ends of the beams. The compensating levers 80 are medially pivotally connected to the uprights 14 and have the weights 78 adjustably connected to their longer ends and these ends are adapted to rest upon stops 81 projecting from the uprights when the scale hoppers are in their discharging positions. These projections also extend beneath the weight pan ends of the scale beam to limit the downward swing of said ends. The shorter ends of the levers 80 extend beneath pins 82 projecting from the scale beams and serve to initially start the movement of the beams to a discharging position and also counterbalance the weights 77. Stop lugs 83 projecting from the sides of the uprights and extending beneath the scale beams limit the downward movement of the hopper supporting ends of the scale beams.

In the operation of the automatic weighing machine the material to be weighed is placed in the supply hopper and the clutch is pushed into engagement with the complementary clutch face of the pulley to start the rotation of the cam shaft. The upper cam of the shaft will alternately engage the cam arms and swing the feed tube valves to open position and the spring controlled rock shafts will retrieve said valves when disengaged by the cams. The material will drop into the charge holding hoppers and the covers thereof and fill said hoppers and covers with material to an extent controlled by the adjustable feed tubes. If it is desired to weigh and separate the material into pound quantities the adjustable tubes are adjusted to permit an amount of material slightly less than one pound to enter each holding hopper. The further rotation of the cam shaft will cause the plunger rod cam shaft to engage the plunger rod of the scale beam which is in its uppermost position and force the plunger rod outwardly and the holding hopper valve and the supplemental valve which are connected thereto will be swung to open positions. The holding hopper valve in swinging to open position will cover the discharge opening of the independent hopper compartment and prevent the discharge of material therefrom. The material in the hopper above this holding hopper valve will immediately be discharged into the scale hopper therebeneath and when the cam rotates out of engagement with the plunger rod the coiled spring surrounding said rod will force it and the holding hopper valve to closed position. When the supplemental valve was swung to open position by the holding hopper valve the outer bell crank arm of said valve swung beneath and raised the antifriction roller of the bell crank trigger and when on the opposite side of said roller the roller swung downwardly by gravity to a position in front of the arm and held said arm and valve forming part thereof in open position. In this position the lower hook arm of the bell crank trigger is in the path of movement of the outwardly projecting pin of the scale beam. As soon as the holding hopper valve has swung to closed position the material in the independent holding hopper compartment will discharge a fine stream into the supplemental feed compartment of the scale hopper and this material will quickly charge the hopper with the required weight and cause it to descend to its discharging position. In descending the projecting pin will engage the bell crank trigger and swing the antifriction roller thereof out of engagement with the arm of the supplemental valve and said valve will be swung to its closed position by the flat bracket spring. When the scale hopper has reached its discharging position the scale hopper latch of this particular hopper will be in the path of movement of the releasing lever on the same side of the machine and when the antifriction roller of said lever enters the recess or notch of the notched wheel the said lever will trip the latch from the hopper door and the weight of material within the hopper will open the door and be discharged therefrom. As soon as discharged the counterweight of said door will close and latch said door and the scale weight will elevate the hopper to charging position again and the same operation will be repeated.

The hoppers are adapted to be alternately filled and alternately emptied and the weighing operation proceeds in a continuous manner. The provision of the cam pins provides for stopping the charging of the scale hoppers except when in charging position and the compensating weights provide for accurately adjusting the scale beam to compensate for the material in suspension, or in other words, the material which is dropping after the valves are closed and while the scale hoppers are descending.

From the foregoing description it will be seen that the weighing machine is automatic and continuous in its operations and is provided with means for accurately adjusting the parts.

It is to be understood that this invention is not limited to any specific form or arrangement of parts except in so far as such limitations are specified in the claims.

What I claim as my invention is:

1. An automatic weighing machine, comprising a scale beam provided with weights at one end and a scale hopper at the other end having a discharge door in its lower portion, a holding hopper located above the scale hopper and provided with a discharge opening, a valve controlling said opening, a feed chute located above the holding hopper and provided with a valve closing its lower open end, a driven shaft, and mechanisms actuated by the shaft for controlling the opening and closing of the valves and the discharge door.

2. An automatic weighing machine, comprising a scale beam provided with weights at one end and a scale hopper at the other end having a discharge door in its lower portion, a holding hopper located above the scale hopper and provided with a discharge opening, a valve controlling said opening, a feed chute located above and extending into the holding hopper and provided with a valve closing its lower open end, a supplemental feed chute located to discharge material into the scale hopper and provided with a supplemental valve controlling its discharge opening, a driven shaft, and mechanisms actuated by the shaft for controlling the opening and closing of the valves and the discharge door.

3. An automatic weighing machine, comprising scale beams provided with weights at one end and scale hoppers at their other ends having discharge doors in their lower portions, holding hoppers located above the respective scale hoppers and provided with discharge openings, valves controlling said openings, feed chutes located above the respective holding hoppers and provided with valves closing their lower open ends, a driven shaft, and mechanisms actuated by the shaft for alternately controlling the opening and closing of the valves and the discharge doors of the respective hoppers and chutes.

4. An automatic weighing machine, comprising scale beams provided with weights at one end and scale hoppers at their other ends having discharge doors in their lower portions, holding hoppers located above the respective scale hoppers and provided with discharge openings, valves controlling said openings, feed chutes located above the respective holding hoppers and provided with valves closing their lower open ends, supplemental feed chutes located to discharge material into the scale hoppers and provided with supplemental valves controlling their discharge openings, a driven shaft, and mechanisms actuated by the shaft for alternately controlling the opening and closing of the valves and the discharge doors of the respective hoppers and chutes.

5. An automatic weighing machine, comprising a main frame having a scale beam fulcrumed thereon which is provided with weights at one end and with a scale hopper at its other end, a discharge door forming the lower part of the hopper, a holding hopper located above the scale hopper and provided with a discharge opening and with a supplemental material holding compartment having a discharge opening, a valve closing said hopper discharge opening, a valve closing the supplemental compartment discharge opening and positioned in the path of movement of the hopper valve toward its open position, means for moving the hopper valve and the supplemental valve to open positions, means for holding the supplemental valve in open position after the hopper valve has returned to its closed position, a feed chute located above the holding hopper and having a discharge opening in its lower end, a valve normally closing said discharge opening, a shaft journaled on the frame, mechanisms actuated by the shaft for moving the valves to open positions and for controlling the opening of the door, means for releasing the supplemental valve from its open position when the scale hopper has received its predetermined amount of material, and means for closing the hopper door after the material has been discharged from the scale hopper.

6. An automatic weighing machine, comprising a main frame having scale beams fulcrumed thereon which are provided with weights at one end and with scale hoppers at their other ends, a discharge door forming the lower part of each hopper, holding hoppers located above the scale hoppers and provided with discharge openings and with supplemental material holding compartments having discharge openings, valves closing the supplemental compartment discharge openings and positioned within the paths of movement of the hopper valves toward open position, means for alternately moving the hopper valves and the supplemental valve of each scale and holding hopper to open positions, means for alternately holding the supplemental valves in open position after the adjacent hopper valve has returned to its closed position, a feed chute located above each holding hopper and provided with discharge openings in their lower ends, supplemental valves normally closing said discharge openings, a shaft journaled on the frame, mechanisms actuated by the shaft for alternately moving the valves of the holding hoppers and the feed chutes to open positions and for alternately controlling the opening of the doors of the scale hoppers, means for alternately releasing the supplemental valves from open positions when the scale hoppers have received their predetermined amounts of material, and means for closing the doors of the scale hoppers after the material has been discharged therefrom.

7. An automatic weighing machine, comprising a main frame having scale beams fulcrumed thereon which are provided with weights at one end and with scale hoppers at their other ends, each hopper being provided with a discharge opening and a hinged door closing the opening, said doors provided with means for normally holding them in closed positions and having a latched engagement with the hoppers, a holding hopper located above each scale hopper and provided with a discharge opening, a feed chute located above each scale hopper and provided with a discharge opening closed by a supplemental valve, a valve closing each holding hopper discharge opening and positioned to engage and move to open position the supplemental valve adjacent thereto, said hopper valves positioned to close the discharge openings of the feed chutes when alternately swung to open positions, a lever for holding each supplemental valve in open position after the adjacent hopper valve has returned to its closed position, slidable members for alternately moving the holding hopper valves to open positions, a shaft journaled on the frame and provided with a plurality of cams, mechanisms actuated by the cams for engaging the holding hopper and the feed chute valves to move them to open position and for engaging the latched connections between the scale hoppers and their doors to permit said doors to open, and means provided for moving the levers to release the supplemental valves and permit them to swing to closed position.

8. An automatic weighing machine, comprising a main frame having scale beams fulcrumed thereon which are provided with weights at one end and with scale hoppers at their other ends, each hopper being provided with a discharge opening and a hinged door closing the opening, said doors provided with means for normally holding them in closed positions and having a latched engagement with the hoppers, a holding hopper located above each scale hopper and provided with a discharge opening, a feed chute located above each scale hopper and provided with a discharge opening closed by a supplemental valve, a valve closing each holding hopper discharge opening and positioned to engage and move to open position the supplemental valve adjacent thereto, said hopper valves positioned to close the discharge openings of the feed chutes when alternately swung to open positions, a lever for holding each supplemental valve in open position after the adjacent hopper valve has returned to its closed position, spring retrieved slidable members having a connection with the holding hopper valves for moving said valves to open position, slidable cam pins carried by said members and positioned to be engaged by the weight beams, a shaft journaled on the frame and provided with a plurality of cams, one of said cams positioned to alternately engage the cam pins when said pins are engaged by the scale beams, mechanisms actuated by the other cams for engaging the feed chute valves to move them to open positions and for engaging the latched connections between the scale hoppers and their doors to permit said doors to swing to open positions, and means provided for moving the levers to release the supplemental valves and permit them to swing to closed positions.

9. An automatic weighing machine, comprising a main frame having scale beams fulcrumed thereon which are provided with weights at one end and with scale hoppers at their other ends, each hopper being provided with a discharge opening and a hinged door closing the opening, said doors provided with projecting arms carrying weights adjustable thereon for normally closing the doors, latches provided for locking the doors in closed positions, a holding hopper located above each scale hopper and provided with a discharge opening and with a supplemental feed compartment also provided with a discharge opening, an adjustable feed chute located above each holding hopper and provided with a discharge opening, pivoted valves closing the holding hopper openings, spring retrieved slidable bolts connected to the holding hopper valves and provided with tubular portions, cam pins slidably extending through the tubular portions, supplemental valves closing the discharge openings of the supplemental feed compartment and positioned in the paths of movements of the holding hopper valves and adapted to be moved thereby to open positions, bell crank levers for engaging said supplemental valves and to hold them in open positions after the holding hopper valves have been retrieved, spring retrieved valves closing the discharge openings of the adjustable feed chutes, a vertically extending cam shaft journaled on the main frame, a cam provided on the shaft for engaging the cam pins when they are moved in the path of movements of the cam by the scale beams, a cam carried on the upper portion of the shaft for swinging the feed chute valves to open positions, a cam wheel carried by the lower end of the shaft, spring retrieved releasing levers mounted on the frame and positioned on opposite sides of the cam wheel, said levers adapted to bear on the cam and to engage the latches of the scale hopper, and projections provided on the scale beams for engaging the bell crank levers to release the supplemental valves and permit them to swing to closed positions.

10. An automatic weighing machine, comprising a main frame having scale beams fulcrumed thereon which are provided with weights at one end and with scale hoppers at their other ends, each hopper being provided with a discharge opening and a hinged door closing the opening, said doors provided with projecting arms carrying weights adjustable thereon for normally closing the doors, latches provided for locking the doors in closed positions, a holding hopper located above each scale hopper and provided with a discharge opening and with a supplemental feed compartment also provided with a discharge opening, an adjustable feed chute located above each holding hopper and provided with a discharge opening, pivoted valves closing the holding hopper openings, spring retrieved slidable bolts connected to the holding hopper valves and provided with tubular portions, cam pins slidably extending through the tubular portions, supplemental valves closing the discharge openings of the supplemental feed compartments and positioned in the paths of movements of the holding hopper valves and adapted to be moved thereby to open positions, bell crank levers for engaging said supplemental valves and to hold them in open positions after the holding hopper valves have been retrieved, spring retrieved rock shafts journaled on the frame, valves carried by said rock shafts for closing the discharge openings of the adjustable feed chutes, cam arms carried by said rock shafts, a vertically extending cam shaft journaled on the frame, a cam carried by the cam shaft for engaging the cam pins and moving the plunger rods when the cam pins are moved in the paths of movement of the cam, a cam carried by the upper portion of the cam shaft for engaging the cam arms, a cam wheel carried by the lower portion of the cam shaft, spring retrieved releasing levers mounted on the frame and positioned on opposite sides of the cam wheel, said levers adapted to bear on the cam and to engage the latches of the scale hopper, and projections provided on the scale beams for engaging the bell crank levers to release the supplemental valves and permit them to swing to closed positions.

11. An automatic weighing machine, comprising a main frame having scale beams fulcrumed thereon which are provided with weights at one end and with scale hoppers at their other ends, each hopper being provided with a discharge opening and a hinged door closing the opening, said doors provided with projecting arms carrying weights adjustable thereon for normally closing the doors, latches provided for locking the doors in closed positions, a holding hopper located above each scale hopper and provided with a discharge opening and with a supplemental feed compartment also provided with a discharge opening, an adjustable feed chute located above each holding hopper and provided with a discharge opening, pivoted valves closing the holding hopper openings, spring retrieved slidable bolts connected to the holding hopper valves and provided with tubular portions, cam pins slidably extending through the tubular portions, supplemental valves closing the discharge openings of the supplemental feed compartment and positioned in the paths of movements of the holding hopper valves and adapted to be moved thereby to open positions, bell crank levers for engaging said supplemental valves and to hold them in open positions after the holding hopper valves have been retrieved, spring retrieved rock shafts journaled on the frame, valves carried by said rock shafts for closing the discharge openings of the adjustable feed chutes, cam arms carried by said rock shafts, a vertically extending cam shaft journaled on the frame, a cam carried by the cam shaft for engaging the cam pins and moving the plunger rods when the cam pins are moved in the paths of movement of the cam, a cam carried by the upper portion of the cam shaft for engaging the cam arms, a cam wheel carried by the lower portion of the cam shaft, spring retrieved releasing levers mounted on the frame and positioned on opposite sides of the cam wheel, said levers adapted to bear on the cam and to engage the latches of the scale hoppers, compensating levers provided with weights adjustably connected thereto for engaging the scale beams, and projections provided on the scale beams for engaging the bell crank levers to release the supplemental valves and permit them to swing to closed positions.

12. An automatic weighing machine, comprising a main frame having scale beams fulcrumed thereon which are provided with weights at one end and with scale hoppers at their other ends, each hopper being provided with a discharge opening and a hinged door closing the opening, said doors provided with projecting arms carrying weights adjustable thereon for normally closing the doors, latches provided for locking the doors in closed positions, a holding hopper located above each scale hopper and provided with a discharge opening and with a supplemental feed compartment also provided with a discharge opening, an adjustable feed chute located above each holding hopper and provided with a discharge opening, pivoted valves closing the holding hopper openings, spring retrieved slidable bolts connected to the holding hopper valves and provided with tubular portions, cam pins slidably extending through the tubular portions, supplemental valves closing the discharge openings of the supplemental feed compartment and positioned in the paths of movements of the holding hopper valves and adapted to be moved thereby to open positions, bell crank levers for engaging said supplemental valves and to hold them in open positions after the holding hopper valves have been retrieved, spring retrieved valves closing the discharge openings of the adjustable feed chutes, a vertically extending cam shaft journaled on the main frame, a horizontal shaft journaled on the frame and having a geared connection with the cam shaft, a wheel loosely journaled on the horizontal shaft and provided with a clutch face, a slidable clutch member splined to the horizontal shaft and adapted to be moved into engagement with the clutch face of the wheel, a cam provided on the shaft for engaging the cam pins when they are moved in the path of movements of the cam by the scale beams, a cam carried on the upper portion of the shaft for swinging the feed chute valves to open positions, a cam wheel carried by the lower end of the shaft, spring retrieved releasing levers mounted on the frame and positioned on opposite sides of the cam wheel, said levers adapted to bear on the cam and to engage the latches of the scale hopper, and projections provided on the scale beams for engaging the bell crank levers to release the supplemental valves and permit them to swing to closed positions.

In testimony whereof, I affix my signature, in presence of two witnesses.

JOSIAH NIELD.

Witnesses:
R. S. C. CALDWELL,
LAURA A. KELLEY.

Copies of this patent may be obtained for five cents each, by addressing the "Commissioner of Patents, Washington, D. C."